US009211618B2

(12) United States Patent
Hethcock et al.

(10) Patent No.: US 9,211,618 B2
(45) Date of Patent: Dec. 15, 2015

(54) METHOD OF SECURING COMPOSITE CORE DURING A MANUFACTURING PROCESS

(71) Applicant: Bell Helicopter Textron Inc., Fort Worth, TX (US)

(72) Inventors: James D. Hethcock, Colleyville, TX (US); Jonathan A. Freeman, North Richland Hills, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 129 days.

(21) Appl. No.: 14/136,579

(22) Filed: Dec. 20, 2013

(65) Prior Publication Data
US 2015/0174717 A1 Jun. 25, 2015

(51) Int. Cl.
*B29C 65/78* (2006.01)
*B32B 37/10* (2006.01)
(Continued)

(52) U.S. Cl.
CPC ............ *B23Q 3/1546* (2013.01); *B25B 11/002* (2013.01); *B29D 99/0089* (2013.01); *B32B 3/12* (2013.01); *B32B 5/022* (2013.01); *B32B 5/024* (2013.01); *B32B 15/14* (2013.01); *B32B 37/10* (2013.01); *B32B 37/16* (2013.01); *B29C 53/60* (2013.01); *B29C 65/48* (2013.01); *B29C 65/5057* (2013.01); *B29C 65/785* (2013.01); *B29C 66/1122* (2013.01); *B29C 66/1248* (2013.01); *B29C 66/1312* (2013.01); *B29C 66/43* (2013.01); *B29C 66/438* (2013.01); *B29C 66/5227* (2013.01); *B29C 66/63* (2013.01); *B29C 66/7254* (2013.01); *B29L 2031/082* (2013.01); *B29L 2031/3088* (2013.01); *B29L 2031/608* (2013.01); *B32B 2037/1081* (2013.01); *B32B 2260/021* (2013.01); *B32B 2260/046* (2013.01);

(Continued)

(58) Field of Classification Search
CPC .............. B29C 65/785; B29C 65/7855; B32B 2037/1081; B25B 11/002; B29L 2031/3076–2031/3088; Y10T 428/24149; Y10T 428/24165; Y10T 156/1016; Y10T 156/1075
USPC ......................................... 156/228
See application file for complete search history.

(56) References Cited

U.S. PATENT DOCUMENTS 3,366,530 A * 1/1968 Kodich .......................... 428/116
4,907,920 A * 3/1990 Lund et al. .................... 409/132
(Continued)

FOREIGN PATENT DOCUMENTS

WO 2011097433 A1 8/2011
WO 2012072149 6/2012

OTHER PUBLICATIONS

European Search Report in related European Application No. 14153869.4, dated Jul. 18, 2014, 5 pages.
(Continued)

*Primary Examiner* — Carson Gross
(74) *Attorney, Agent, or Firm* — Noah A. Tevis

(57) ABSTRACT

A method of carving a contour surface on a composite core can include positioning a first edge of the composite core against a first tooled member; locating a first magnet within an outer cell member along the first edge of the composite core so that the first edge of the composite core is magnetically drawn to the first tooled member; locating a second magnet along a second edge of the composite core such that the second edge of the composite core is magnetically drawn to a second tooled member; and carving a first contour of the composite core.

6 Claims, 16 Drawing Sheets

(51) Int. Cl.
*B25B 11/00* (2006.01)
*B23Q 3/154* (2006.01)
*B29D 99/00* (2010.01)
*B32B 3/12* (2006.01)
*B32B 37/16* (2006.01)
*B32B 5/02* (2006.01)
*B32B 15/14* (2006.01)
*B29L 31/30* (2006.01)
*B29C 65/48* (2006.01)
*B29C 65/50* (2006.01)
*B29C 65/00* (2006.01)
*B29C 53/60* (2006.01)
*B29L 31/60* (2006.01)
*B29L 31/08* (2006.01)

(52) U.S. Cl.
CPC ... *B32B2262/0269* (2013.01); *B32B 2262/101* (2013.01); *B32B 2262/106* (2013.01); *B32B 2305/024* (2013.01); *B32B 2313/04* (2013.01); *B32B 2603/00* (2013.01); *Y10T 29/49995* (2015.01); *Y10T 29/49998* (2015.01); *Y10T 156/10* (2015.01)

(56) References Cited

U.S. PATENT DOCUMENTS

| | | | |
|---|---|---|---|
| 5,108,810 A | | 4/1992 | Williams |
| 5,139,596 A | * | 8/1992 | Fell ............................ 156/205 |
| 5,549,773 A | * | 8/1996 | Henderson et al. ........... 156/173 |
| 6,928,715 B2 | | 8/2005 | Fanucci et al. |
| 6,986,827 B2 | * | 1/2006 | Matsui et al. ............ 156/306.9 |
| 7,063,763 B2 | | 6/2006 | Chapman, Jr. |
| 2006/0251847 A1 | | 11/2006 | Hethcock et al. |
| 2010/0071192 A1 | | 3/2010 | Sarh et al. |
| 2010/0124659 A1 | | 5/2010 | Nelson |
| 2012/0021165 A1 | | 1/2012 | Hethcock et al. |
| 2012/0321835 A1 | | 12/2012 | Hethcock, Jr. et al. |
| 2013/0224410 A1 | | 8/2013 | Nozawa |

OTHER PUBLICATIONS

Partial European Search Report in related European Application No. 14153870.2, dated Nov. 19, 2014, 6 pages.
Liu et al, Study on clamping method for paper honeycomb based on magnetic field and friction principle, Journal of Materials Processing Technology, Elsevier, NL, vol. 190, No. 1-3, May 11, 2007, 8 pages.
European Search Report in related European Application No. 14153869.4, dated Dec. 10, 2014, 5 pages.
Office Action in related U.S. Appl. No. 14/136,523, dated Oct. 1, 2014, 17 pages.
Communication in related European Application No. 14153868.6, dated Nov. 21, 2014, 3 pages.
1 Office Action in related European Application No. 14153868.6, dated Jan. 28, 2015, 6 pages.
Office Action in related European Application No. 14153869.4, dated Feb. 5, 2015, 5 pages.
Office Action in related European Application No. 14153870.2, dated Mar. 27, 2015, 7 pages.
Notice of Allowance in related U.S. Appl. No. 14/136,523, dated May 20, 2015, 8 pages.
Office Action in related U.S. Appl. No. 14/136,622, dated Jun. 11, 2015, 11 pages.

* cited by examiner

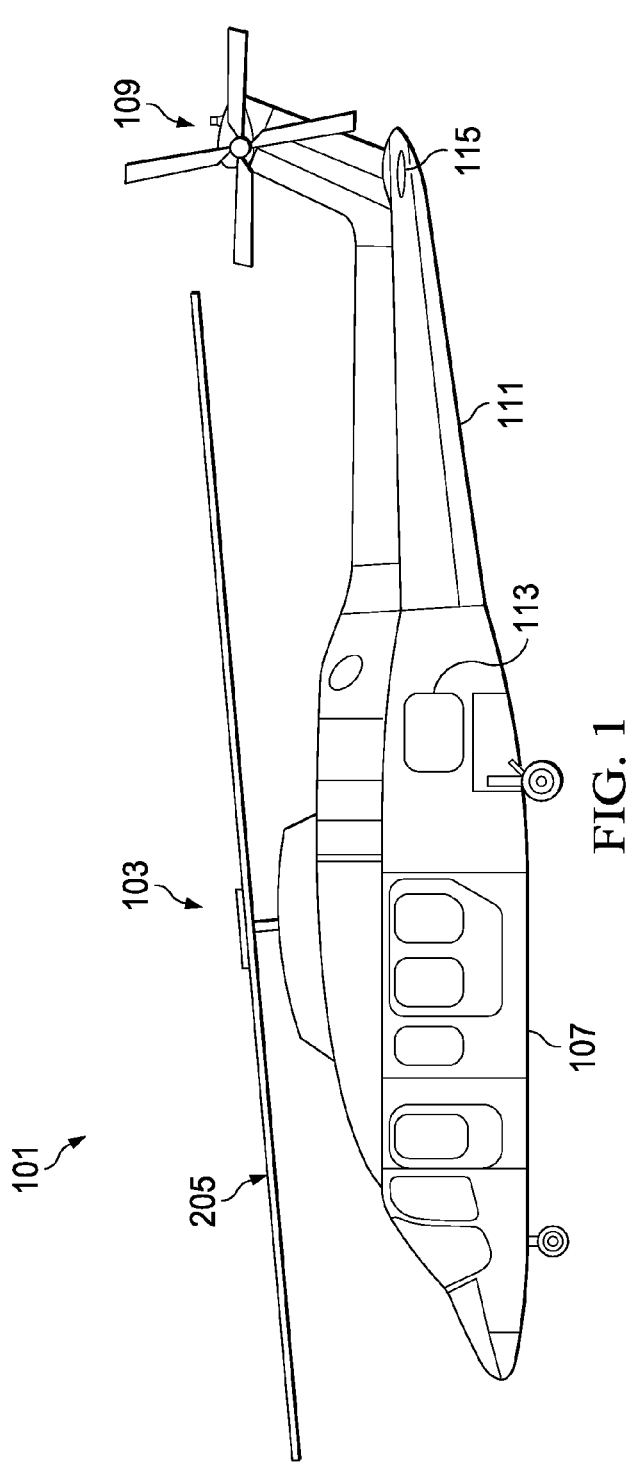
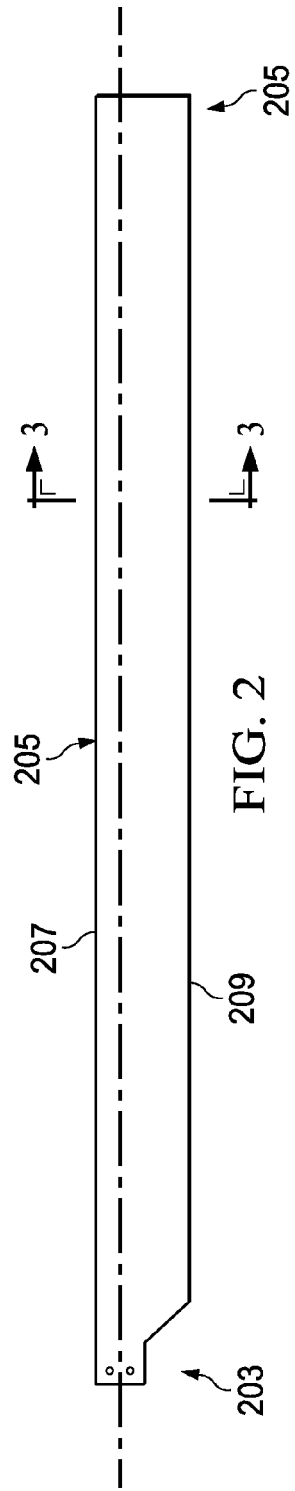
FIG. 1
FIG. 2

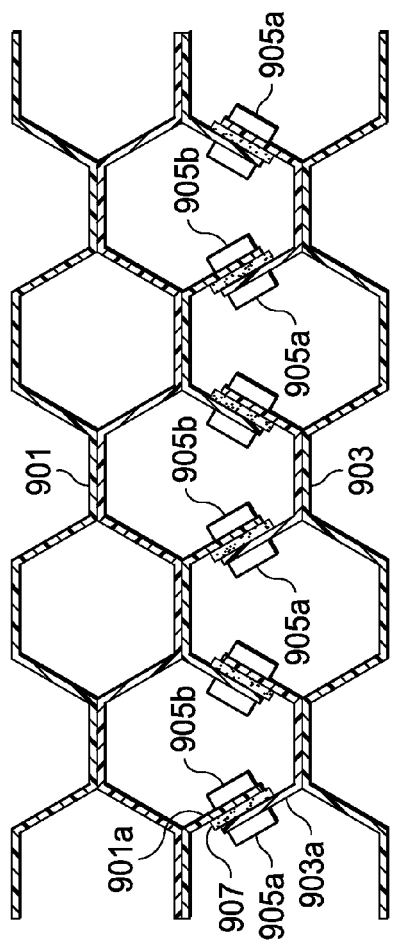
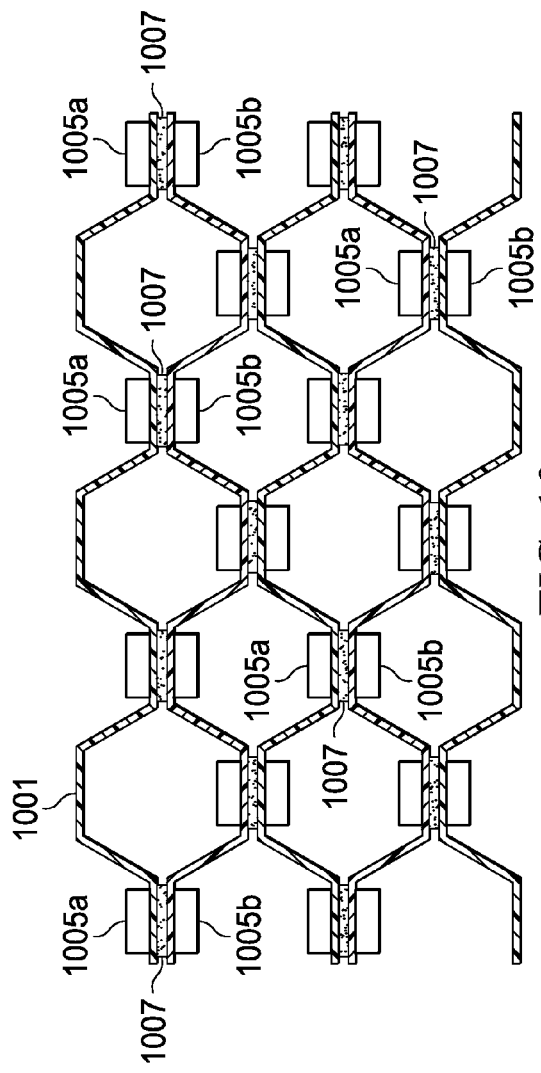

METHOD OF SECURING COMPOSITE CORE DURING A MANUFACTURING PROCESS

BACKGROUND

1. Technical Field

One method of the present disclosure relates to the splicing together of composite core using magnets to provide the requisite pressure at the bondline.

Another method of the present disclosure relates to the use of magnets to secure composite core during a machining process or an assembly process.

Another method of the present disclosure relates to manufacturing net edge core as well as a method of bonding net edge core to a substructure.

2. Description of Related Art

One conventional method of splicing together composite core includes using mechanical clips that apply pressure at the adhesive bondline; however this method is not very effective at large distances from an open edge because the spring force has to be transferred by lever arms over a distance. Additionally, the mechanical clips can interfere with tooling. Another conventional method includes using an expandable foam adhesive that doesn't require artificial pressure at the bondline; however, expandable foam adhesive can be weight prohibitive.

There is a need for an improved method of splicing together composite core.

In a conventional composite core machining process, the composite core is machined to a desired contour for usage in a composite structure. However, the natural instability of the composite core can create high scrap rates and/or require using a machine feed rate low enough to prevent damage to the unstable composite core. Further, an assembly process for a core stiffened structure can also require the securing of the composite core.

There is a need for an improved method of securing composite core during a core machining process or a core assembly process.

A conventional core stiffened structure will typically require a length and width of composite core that is carved out of a larger bulk composite core. The desired length and width of the composite core can sometimes leave flanges rather than flat edges. The flanges are difficult to bond to adjacent substructure.

There is a need for an improved method for manufacturing a more efficient core as well as a method of bonding the core to substructure.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

FIG. 1 is a side view of a illustrative rotorcraft;

FIG. 2 is a top view of a rotor blade, according to an illustrative embodiment;

FIG. 9 is a top view of sections of core material being spliced together, according to an example embodiment;

FIG. 10 is a top view of sections of core material being spliced together, according to an example embodiment;

DESCRIPTION OF THE PREFERRED EMBODIMENT

Figure 3:
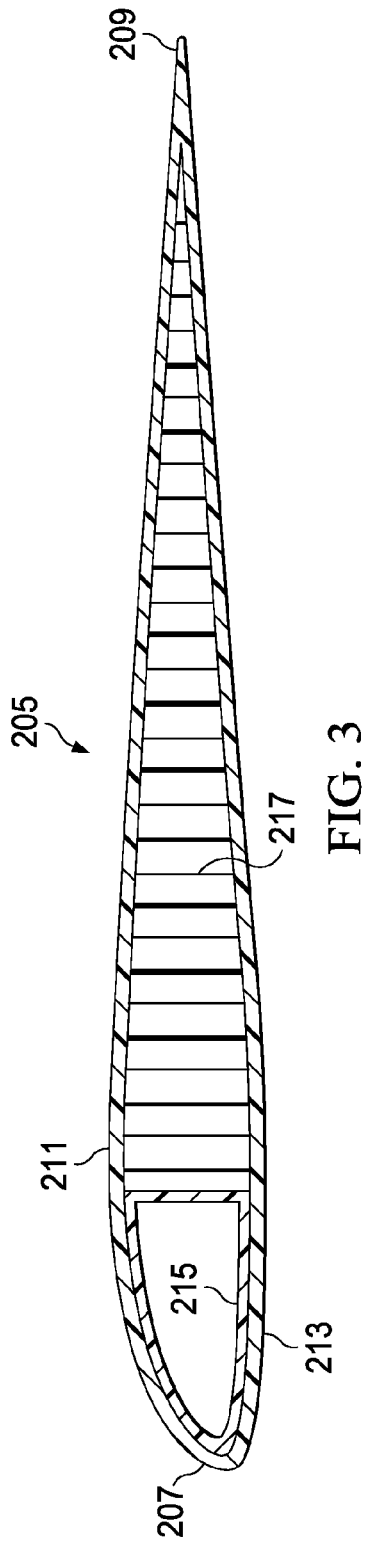
FIG. 3 is a cross-sectional view of the rotor blade, taken from section lines 3-3 in FIG. 2.

Illustrative embodiments of the present disclosure are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Referring now to FIG. 1 in the drawings, a rotorcraft 101 is illustrated. Rotorcraft 101 has a rotor system 103 with a plurality of rotor blades 205. The pitch of each rotor blade 205 can be manipulated in order to selectively control direction, thrust, and lift of rotorcraft 101. Rotorcraft 101 can further include a fuselage 107, anti-torque system 109, and an empennage 111. A variety of members on rotorcraft 101 can be manufacturing as a composite core (such as honeycomb core) stiffened structure, as discussed further herein.

Referring now also to FIGS. 2 and 3, rotor blade 205 is an example of a rotorcraft member than can be configured with core to efficiently provide strength and stiffness. Rotor blade 205 can include a leading edge portion 207, a trailing edge portion 209, a root end portion 203, and a tip end portion 205. In the illustrated embodiment, an upper skin 211 and a lower skin 213 form an aerodynamic surface with a spar member 215 and a core member 217 forming the internal structure.

It should be appreciated that rotorcraft 101 is merely illustrative of an aircraft for with which one or more methods of the present disclosure can be utilized with regard to. Further, rotor blade 205 is merely illustrative of the wide variety of core stiffened structures that can utilize one or methods disclosed herein. In another embodiment, a horizontal stabilizer 115 is the core stiffened structure, for example.

Figure 4:
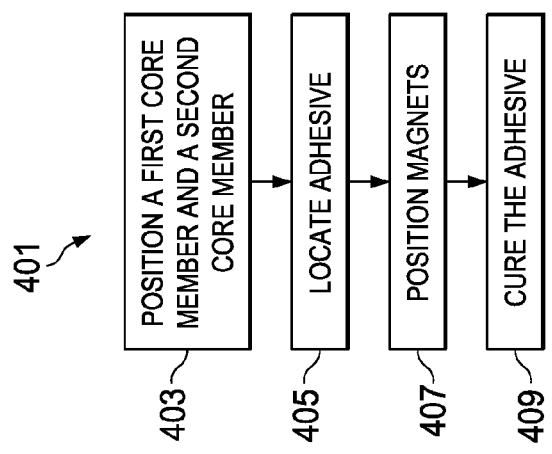
FIG. 4 is a schematic view of a method of splicing together one or more sections of core material is schematically illustrated.

Referring now also to FIG. 4, a method 401 of splicing together one or more sections of core material is schematically illustrated. During fabrication of a core stiffened structure, such as core member 217 in rotor blade 205, it can be necessary to splice one or more sections of core material together. This can be because raw composite core may not be available or practical to be made in sections long enough for a rotor blade 205. However, conventional methods of splicing core material have significant deficiencies, as described further herein.

Method 401 can include a step 403 of positioning a first core member adjacent to a second core member. Step 403 can be implemented in a variety of environments. For example, tooling can be used for aligning a first core member adjacent to second core member; however, tooling is not necessarily required. A step 405 can include locating and adhesive on certain portions of the first core member and/or the second core member. A step 407 can include positioning magnets to apply a pressure to the adhesive. A step 409 can include curing the adhesive. Method 401 and the associated steps are described further herein.

Figure 5:
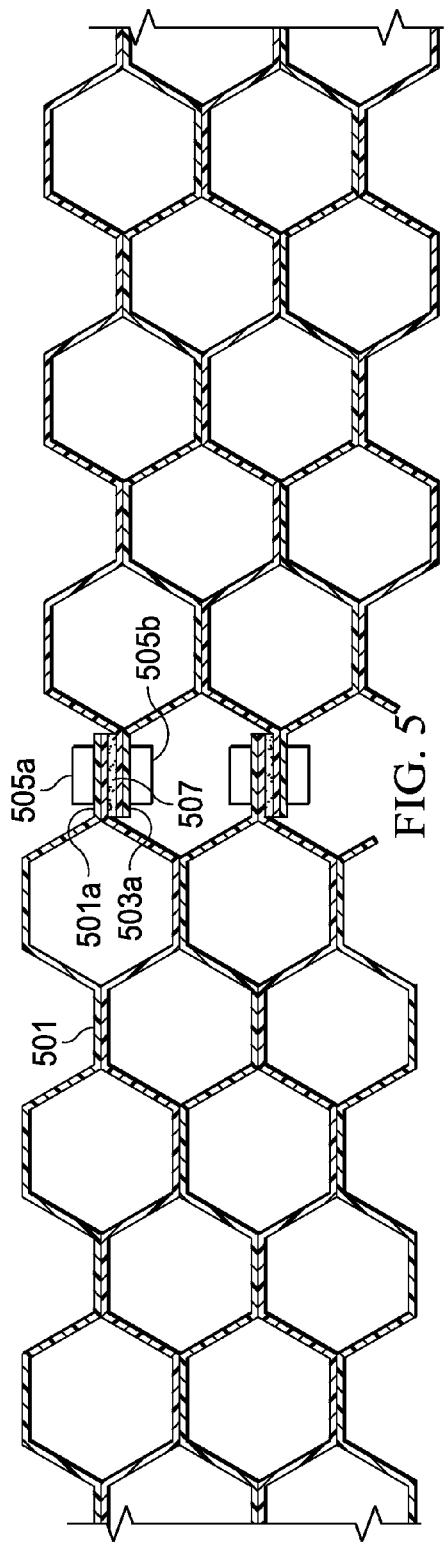
FIG. 5 is a top view of sections of core material being spliced together, according to an example embodiment.

Referring now also to FIG. 5, an embodiment of method 401 is described in further detail. A first core member 501 has flanges 501a exposed from the manufacturing or trimming of the first core member 501. Similarly, second core member 503 has flanges 503a exposed from the manufacturing or trimming of the second core member 503. During the splicing method 401, an adhesive 507 deposited on one or both of the adjacent surfaces of flanges 501a and 503a. The adhesive 507 can be any implementation specific type of adhesive. The adhesive 507 can be a paste adhesive or a film adhesive, to name a few examples. A first magnet 505a and a second magnet 505b can be located adjacent to the outer surfaces of flanges 501a and 503a in order to apply bondline pressure. In another embodiment, the pressure from the magnet attraction is generated by a magnet and a ferrous element. The magnet can be a strip of magnetic material that has a length corresponding with the depth of the composite core. The specific magnet type and material can be implementation specific depending in part on the desired pressure at the bondline. The magnet can be a permanent magnet or an electromagnet, for example.

Figure 6:
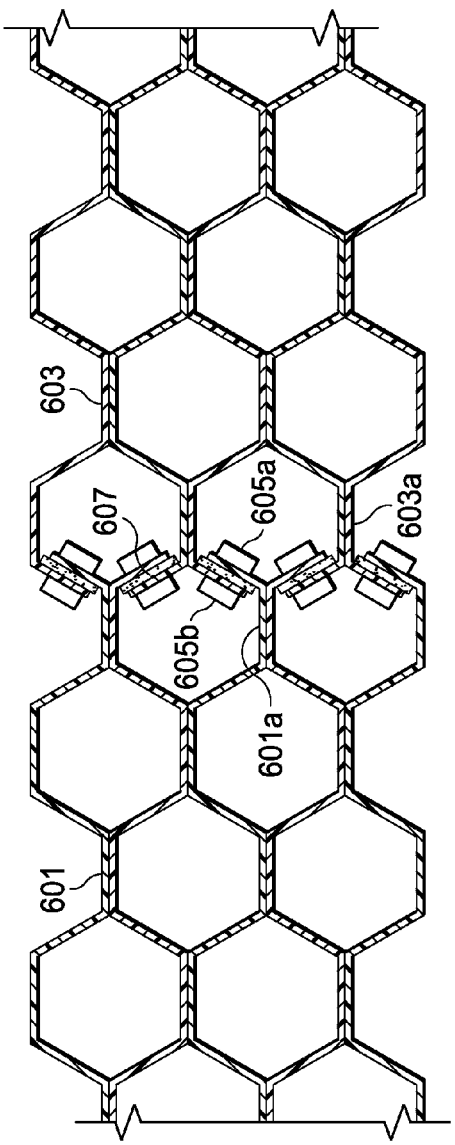
FIG. 6 is a top view of sections of core material being spliced together, according to an example embodiment.

Referring now also to FIG. 6, another embodiment of method 401 is described in further detail. A first core member 601 has "Y" flanges 601a created from the manufacturing or trimming of the first core member 601. Each "Y" flange 601a has multiple leg members. Similarly, second core member 603 has "Y" flanges 603a exposed from the manufacturing or trimming of the second core member 603. Each "Y" flange 603a has multiple leg members. The "Y" flange 601a and 603a are nested together. During the splicing method 401, an adhesive 607 is deposited on the adjacent surfaces of each leg member of flange 601a and on the adjacent surfaces of each leg member of flange 603a. The adhesive 607 can be any implementation specific type of adhesive. The adhesive 607 can be a paste adhesive or a film adhesive, to name a few examples. A first magnet 605a and a second magnet 605b can be located adjacent to the outer surfaces of each leg member of each flange 601a and 603a, in order to apply bondline pressure. In another embodiment, the pressure from the magnet attraction is generated by a magnet and a ferrous element. The magnet can be a strip of magnetic material that has a length corresponding with the depth of the composite core. The specific magnet type and material can be implementation specific depending in part on the desired pressure at the bondline. The magnet can be a permanent magnet or an electromagnet, for example.

Figure 7:
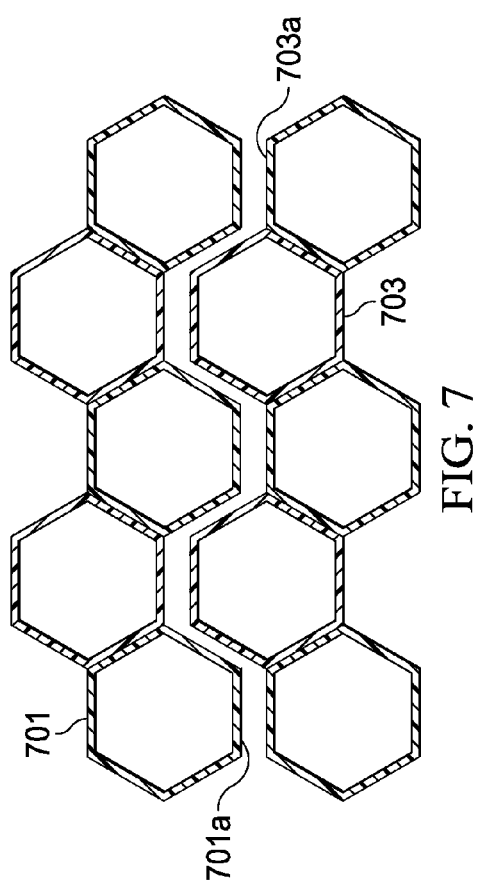
FIG. 7 is a top view of sections of core material being spliced together, according to an example embodiment.
Figure 8:
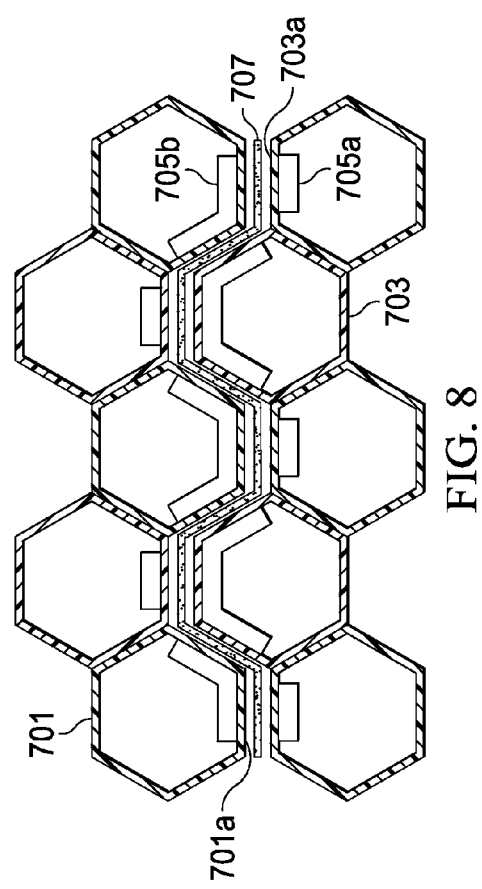
FIG. 8 is a top view of sections of core material being spliced together, according to an example embodiment.

Referring now also to FIGS. 7 and 8, another embodiment of method 401 is described in further detail. A first core member 701 does not have exposed flanges, but rather outer surfaces of enclosed cell members created from the manufacturing or trimming of the first core member 701. Similarly, second core member 703 does not have exposed flanges, but rather enclosed cell members created from the manufacturing or trimming of the second core member 701. During the splicing method 401, an adhesive 707 is deposited on at least one of the outer adjacent surfaces first core member 701 and second core member 703. The adhesive 707 can be any implementation specific type of adhesive. The adhesive 707 can be a paste adhesive or a film adhesive, to name a few examples. A first magnet 705a and a second magnet 705b can be located on the interior side adjacent to the outer surfaces first core member 701 and second core member 703 in order to apply bondline pressure. The first magnet 705a and a second magnet 705b can be geometrically shaped to correspond with the interior shape of the cell members. For example, the magnets can be three edges to correspond with half a hexagonal shape.

In another embodiment, the pressure from the magnet attraction is generated by a magnet and a ferrous element. The magnet can be a strip of magnetic material that has a length corresponding with the depth of the composite core. The specific magnet type, geometry, and material can be implementation specific depending in part on the desired pressure at the bondline. The magnet can be a permanent magnet or an electromagnet, for example.

Referring now also to FIG. 9, an embodiment of method 401 is described in further detail. A first core member 901 has flanges 901a exposed from the manufacturing or trimming of the first core member 901. Similarly, second core member 903 has flanges 903a exposed from the manufacturing or trimming of the second core member 903. During the splicing method 401, an adhesive 907 is deposited on one or both of the adjacent surfaces of flanges 901a and 903a. The adhesive 907 can be any implementation specific type of adhesive. The adhesive 907 can be a paste adhesive or a film adhesive, to name a few examples. A first magnet 905a and a second magnet 905b can be located adjacent to the outer surfaces of flanges 901a and 903a in order to apply bondline pressure. In another embodiment, the pressure from the magnetic attraction is generated by a magnet and a ferrous element. The magnet can be a strip of magnetic material that has a length corresponding with the depth of the composite core. The specific magnet type and material can be implementation specific depending in part on the desired pressure at the bondline. The magnet can be a permanent magnet or an electromagnet, for example.

Referring now also to FIG. 10, an embodiment of method 401 is described in further detail. A ribbon 1001 can be spliced onto an existing core member, or even a plurality of ribbons 1001 can be joined together to form a core. During the splicing method 401, an adhesive 1007 is deposited on one or multiple of the surfaces of the ribbons 1001 at the locations where the ribbons 1001 are adjacent to each other. The adhesive 1007 can be any implementation specific type of adhesive. The adhesive 1007 can be a paste adhesive or a film adhesive, to name a few examples. A first magnet 1005a and a second magnet 1005b can be located adjacent to the outer surfaces of ribbons 1001 in order to apply bondline pressure. In another embodiment, the pressure from the magnetic attraction is generated by a magnet and a ferrous element. The magnet can be a strip of magnetic material that has a length corresponding with the depth of the composite core. The specific magnet type and material can be implementation specific depending in part on the desired pressure at the bondline. The magnet can be a permanent magnet or an electromagnet, for example.

The use of magnets to create pressure at an adhesive bondline for splicing or joining composite core has significant advantages. For example, magnets can be inserted deep into the composite core block, whereas mechanical devices have geometric limitations. In one example embodiment, the magnet can be covered with a low friction material, such as Teflon® tape, to allow the magnet to reduce friction as the magnet is slipped into position within the cell of the core. Further, magnets can provide uniform clamping pressure at the bondline along the entire length of the magnet; whereas mechanical devices, such as spring loaded clips can provide unequal pressure. Further, magnets are low profile and can be located so as to not protrude out of the surface network, thus allowing the adhesive to be co-cured with other components of a core stiffened composite structure.

Figure 11:
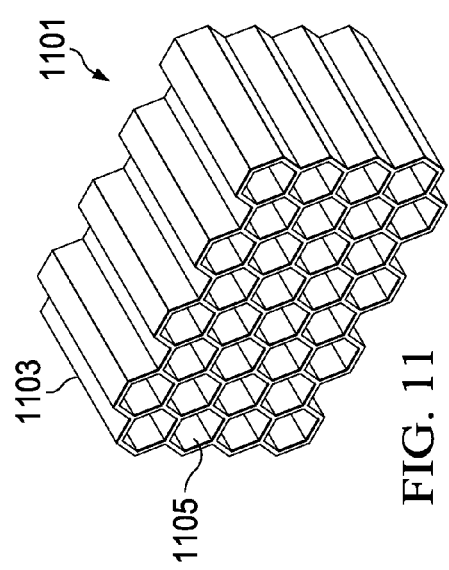
FIG. 11 is a perspective view of composite core, according to an example embodiment.

Referring now to FIG. 11, a composite core 1101 is illustrated in a raw stock configuration. Composite core 217 (shown in FIG. 3), having implementation specific geometry, can be carved from composite core 1101, for example. Composite core 1101 can be of a wide variety of materials and cell sizes. For example, in one embodiment composite core 1101 is made from a carbon fiber and resin composite system. Composite core 1101 includes a plurality of tubes 1103 (only one tube labeled for clarity) arranged in a two-dimensional array. However, in one embodiment the tubes 1103 can be selectively positioned such that the end portions are not in the same plane. Each tube 1103 defines a passageway or "cell" 1105 extending therethrough. Composite core 1101 can comprise any suitable number, size, cross-sectional shape, and construction of tubes 1103.

Each tube 1103 of composite core 1101 can include a plurality of reinforcement fibers disposed in a polymeric matrix. For example, tubes 1103 may comprise fibers comprising one or more of carbon, graphite, glass, an aromatic polyamide (i.e., "aramid") material, a variant of an aromatic polyamide material (e.g., a polyparaphenylene terephthalamide material, such as Kevlar® by E. I. du Pont de Nemours and Company of Richmond, Va.), or the like. The scope of the present disclosure, however, encompasses fibers comprising any suitable material or combination of materials. The polymeric matrix may comprise any suitable resin system, such as a thermoplastic or thermosetting resin for example. Exemplary resins include epoxy, polyimide, polyamide, bismaleimide, polyester, vinyl ester, phenolic, polyetheretherketone (PEEK), polyetherketone (PEK), polyphenylene sulfide (PPS), polyetherimide (PEI), and the like.

The fibers of tubes 1103 may be oriented in one or more directions and can be woven, unwoven, or braided, for example. It should be appreciated that tube 1103 may alternatively only include fibers arranged in a single direction, such as a uniaxial or helical fiber configurations. In yet another embodiment, a first ply comprises fibers and a second ply comprises fibers, such that the second ply is laid-up over the first ply.

Figure 12:
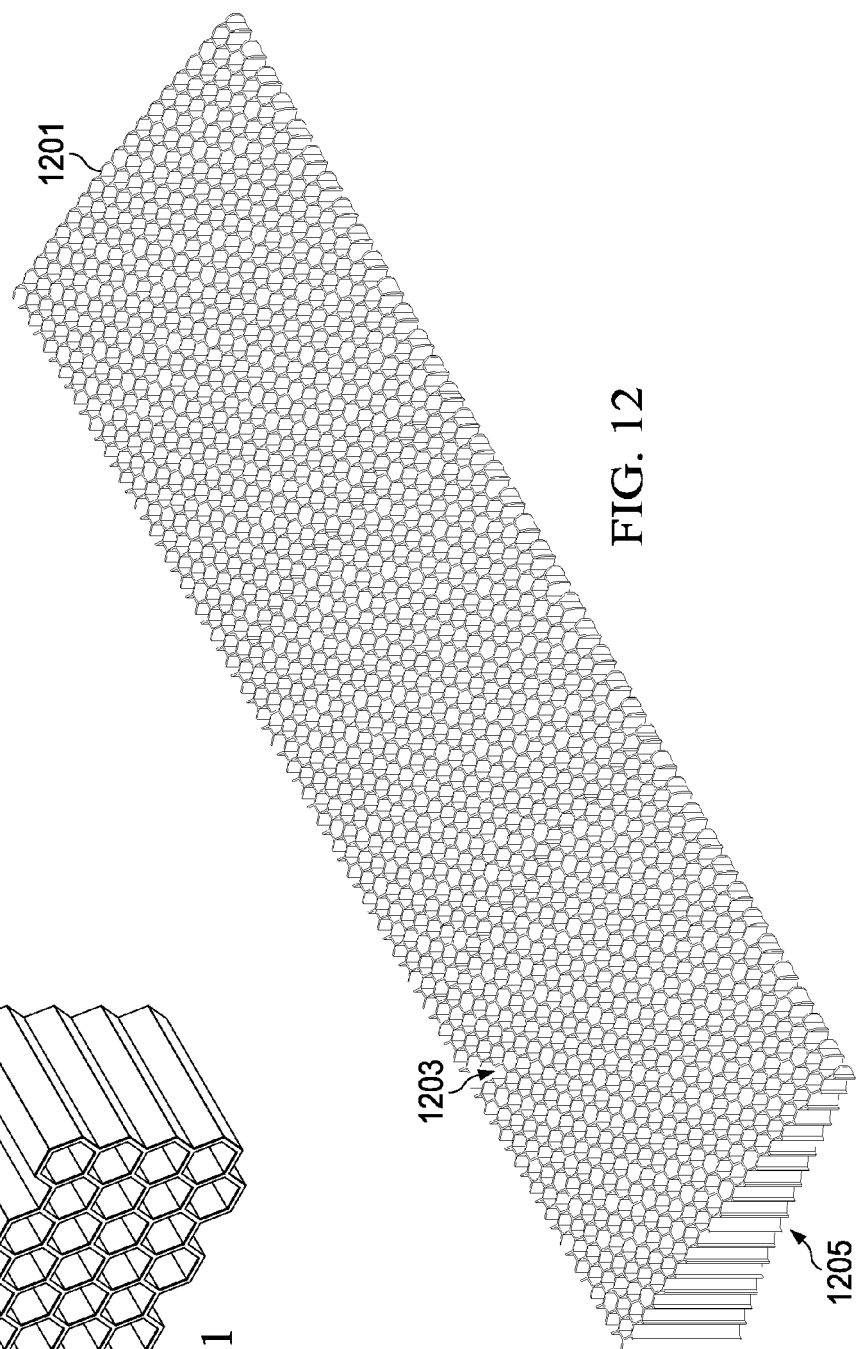
FIG. 12 is a perspective view of carved composite core, according to an example embodiment.

Referring now also to FIG. 12, carved composite core 1201 is illustrated. Carved composite core 1201 has an upper contour 1203 and a lower contour 1205. Carved composite core 1201 can be used in a rotor blade, similar to composite core 217 shown in FIG. 3.

Figure 13:
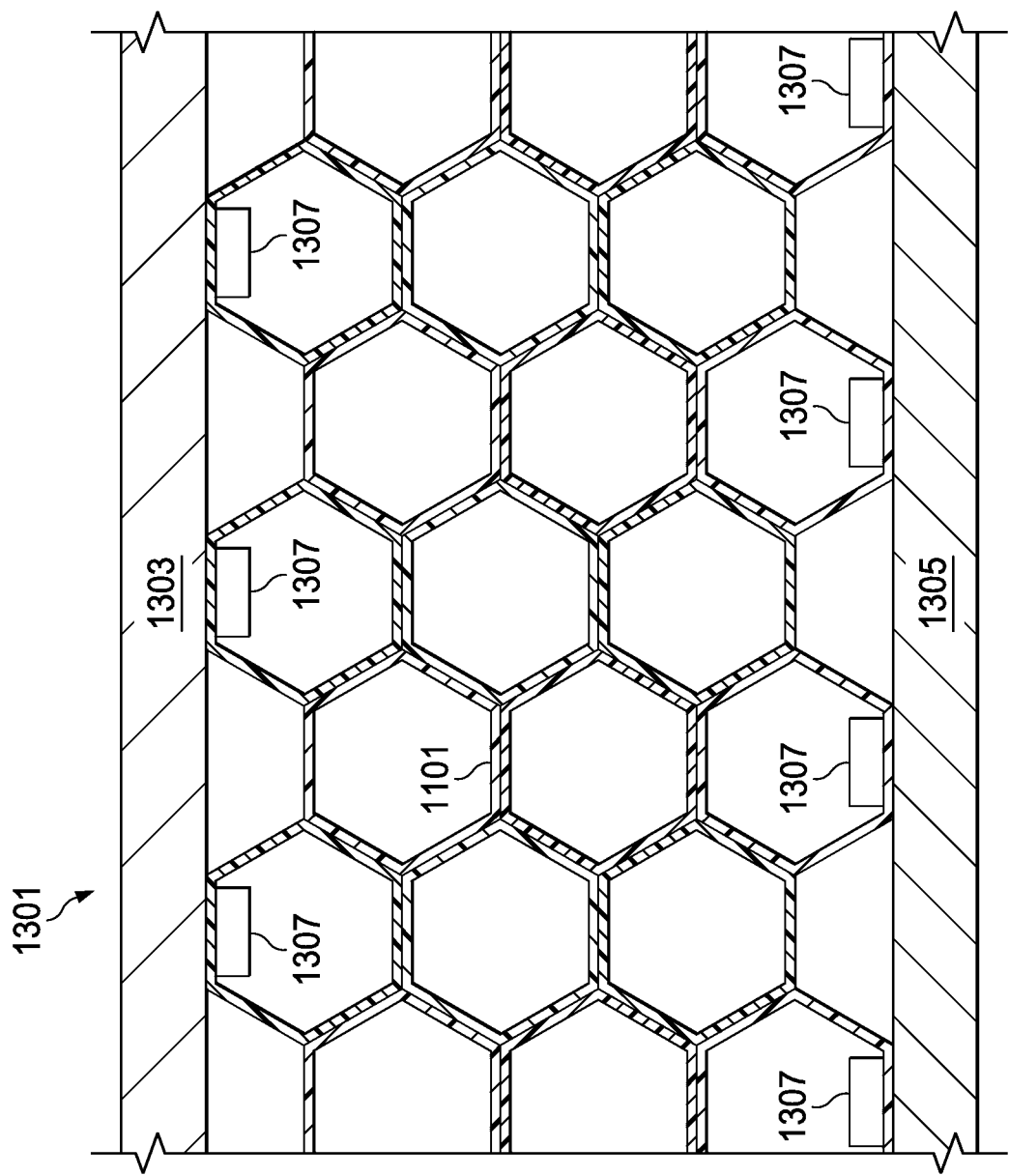
FIG. 13 is a top view of composite core secured in a fixture for machining, according to an example embodiment.

Referring now also to FIG. 13, a composite core 1101 in a tool 1301 is illustrated. Tool 1301 can have a first flange 1303 and a second flange 1305 made with ferrous material. Magnets 1307 are located on the interior of the outside cell walls so as to attract toward the ferrous first flange 1303 and second flange 1305, thereby securing the edges of the composite core 1101 to the tool. Composite core 1101 can be carved in order create the desired contour. In one example, the composite core 1101 is machined to create the desired contour; however, the composite core 1101 can be carved using other methods as well.

Figure 14:
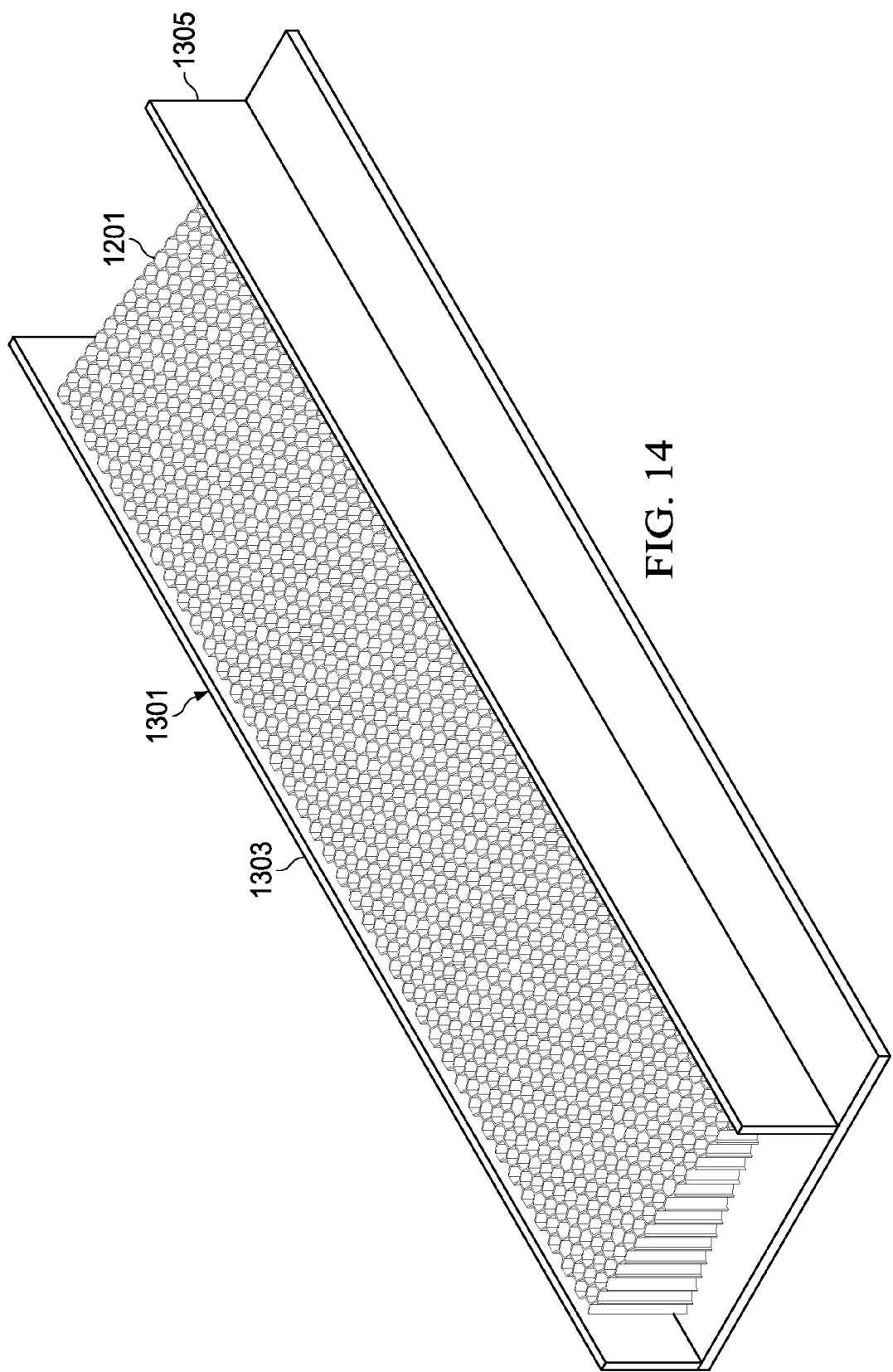
FIG. 14 is a perspective view of composite core secured in a fixture for machining, according to an example embodiment.

Referring also to FIG. 14, a carved composite core 1201 is illustrated while in tool 1301. Magnets 1305 act to secure the composite core 1201 to first flange 1303 and second flange 1305 during the machining process, thus insuring the carved composite core 1201 has the desired dimensions.

In another example embodiment, magnets 1305 are actually ferrous metal members while first flange 1303 and second flange 1305 are magnetic members. Further, it should be appreciated that magnets 1305 within composite core 1201 cell members, and components of tool 1301, such as flanges 1303 and 1305, can be any combination of magnetic components and ferrous components that will provide the desired magnetic attraction for securing composite core 1201 within tool 1301. Further, it should be appreciated that carved composite core 1201 and tool 1301 can take on a wide variety of shapes, sizes, contours, etc. For example, a carved composite core 1201 for a rotor blade 205 (shown in FIG. 1) will have a substantially different geometry as compared to a carved composite core 1201 for a panel 113 (shown in FIG. 1).

Figure 15:
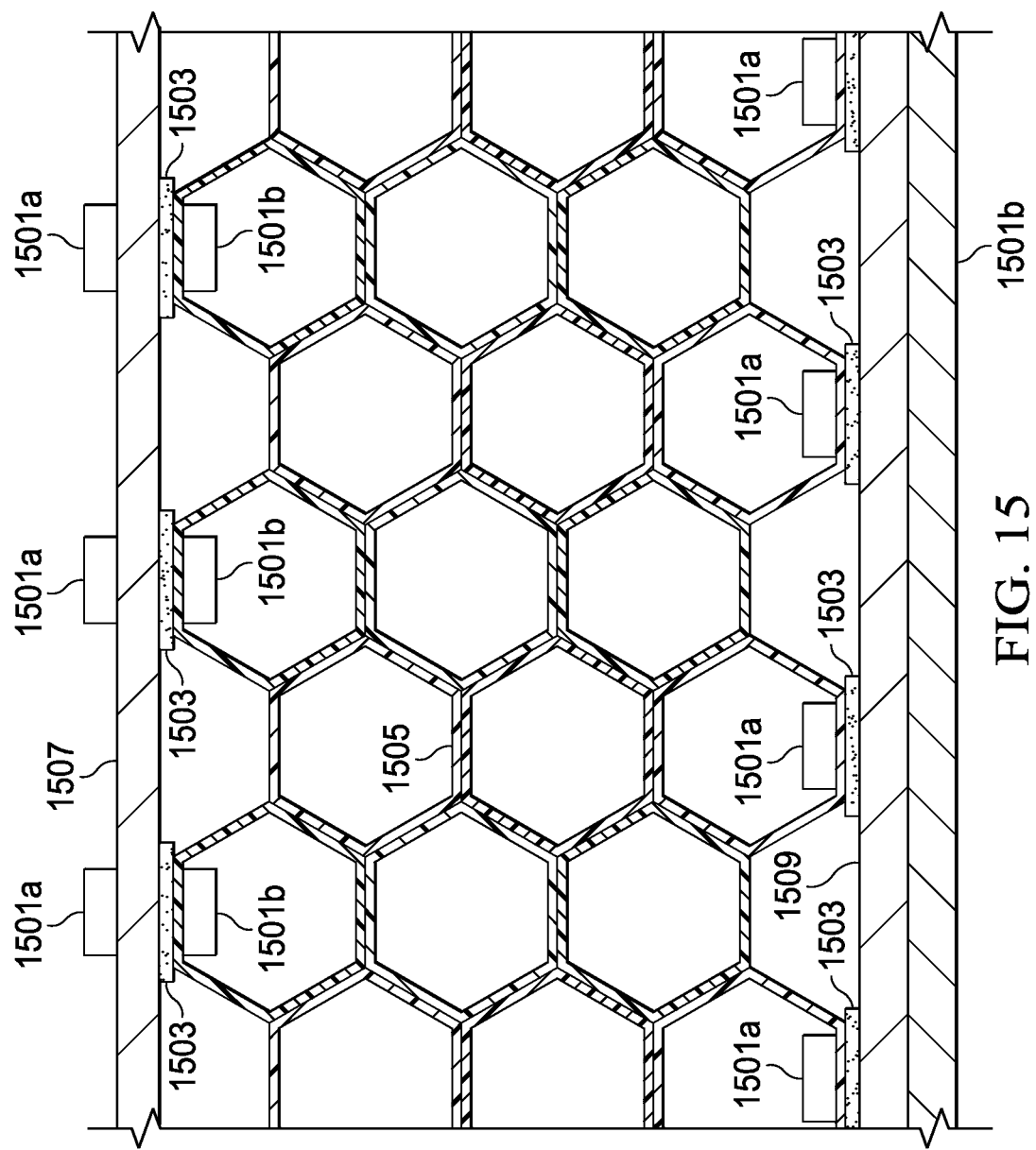
FIG. 15 is a top view of a composite core in a bonding fixture for the bonding of the composite core to a substructure, according to an example embodiment.

Referring now to FIG. 15, a method of bonding a composite core member to a structural component of a core stiffened structure is described and illustrated. It is conventional for the upper and lower surface networks to be adhesive bonded to upper and lower face sheets, respectively. For weight sensitive core stiffened structures, the adhesive is reticulated so as to be focused at the upper and lower surface networks. It can be desirable to also adhesively bond the side portions of the composite core to adjacent structural components; however, conventional methods of generating the requisite bondline pressure have significant shortcomings, as discussed further herein.

One method of the present disclosure utilizes a magnetic force between either two magnets, or a magnet and a ferrous member, to create pressure at a bondline for bonding a composite core to an adjacent structure. In the example embodiment, a composite core 1505 is bonded to an adjacent structural component 1507 with an adhesive 1503. Structural component 1507 can be any variety of components, such as a web member of a structure, an airfoil spar, a clip joint, to name only a few examples. On most circumstances, structural components 1507 is a non-ferrous material, thus a magnet 1501a is located on an opposite surface from the surface to which the adhesive 1503 is located. Magnet 1501b is located on an interior of an enclosed cell member of composite core 1505. Thus, magnets 1501a and 1501b attract to each other and not only act to locate the side of composite core 1505 to the tooled location of the structural component 1507, but also generate the bondline pressure to adhesive 1503 throughout the curing cycle. Once the adhesive 1503 is cured, the magnets 1501a and 1501b can be removed.

Still referring to FIG. 15, composite core 1505 can also be bonded to another structural component 1509 in a similar style to that of component 1507; however, for illustrative purposes magnets 1501b are replaced with a magnetic strip or alternatively a strip of ferrous material. Similar to that of component 1507, component 1509 can be any variety of any variety of components, such as a web member of a structure, an airfoil spar, a clip joint, to name only a few examples.

Figure 16:
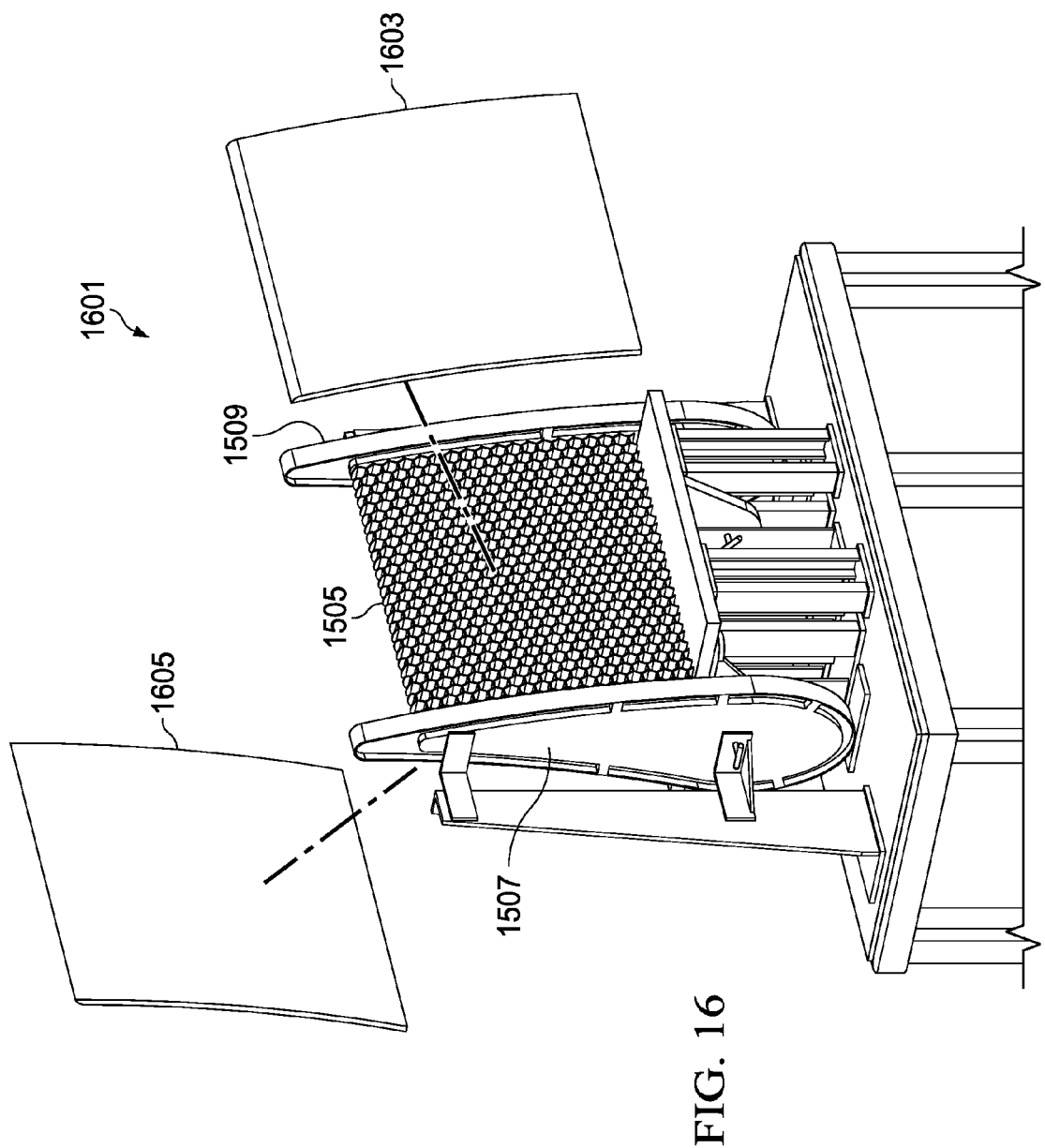
FIG. 16 is a perspective view of a composite core in a bonding fixture for the bonding of the composite core to a substructure, according to an example embodiment.

Referring now also to FIG. 16, an example bond tool assembly 1601 is illustrated. Tooled arms can acts to position and hold structural components 1507 and 1509 in a tooled location. Tooling plates 1603 and 1605 can be utilized to further locate composite core 1501 within bond tool assembly. The magnets described in FIG. 15 act to position composite core 1505 and provide bondline pressure to the adhesive during the curing cycle. After the curing cycle, the magnets can be removed and face sheets can be bonded to the upper and lower surface networks of composite core 1505.

Figure 17:
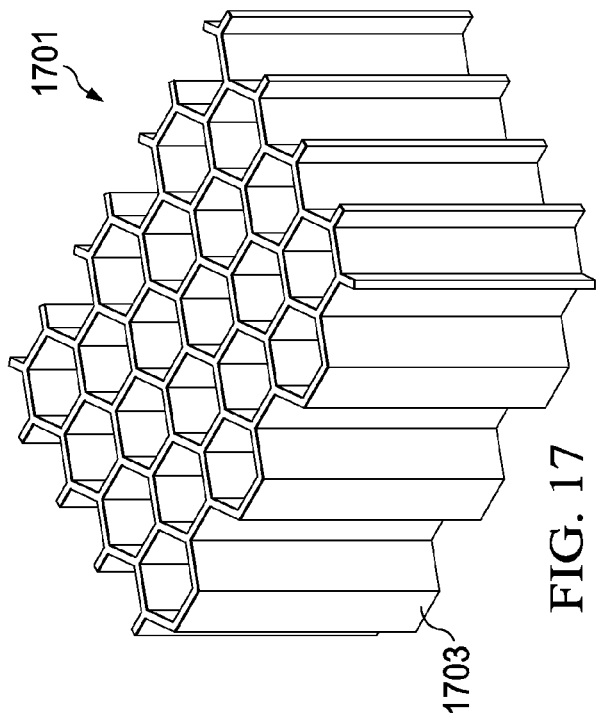
FIG. 17 is a perspective view of a composite core, according to an example embodiment.

Referring now to FIG. 17, a conventional core stiffened structure will typically require a length and width of composite core that is carved out of a larger bulk composite core. The desired length and width of the composite core can sometimes leave flanges on all but one side. For example, FIG. 17 illustrates an example of a composite core 1701 having only single side with flat edges of cells. It is desirable to have more than one flat cell surface for bonding to an adjacent structural component, as well as for purposes for securing the composite core during assembly and/or for purposes of machining, as discussed further herein.

Figure 18:
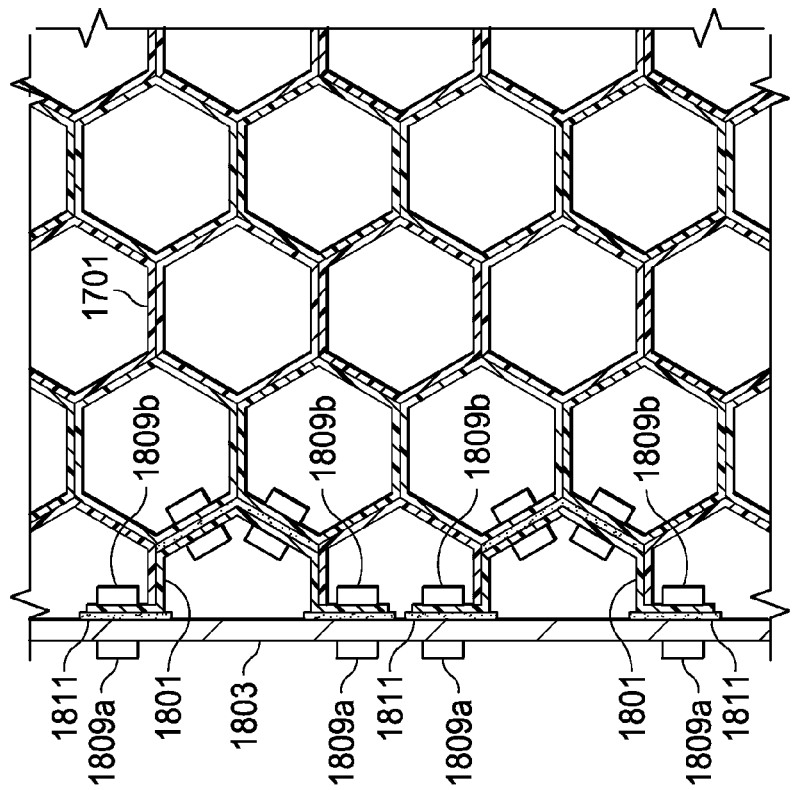
FIG. 18 is a top view of a composite core being bonded to a substructure with an intermediate member, according to one example embodiment.
Figure 19:
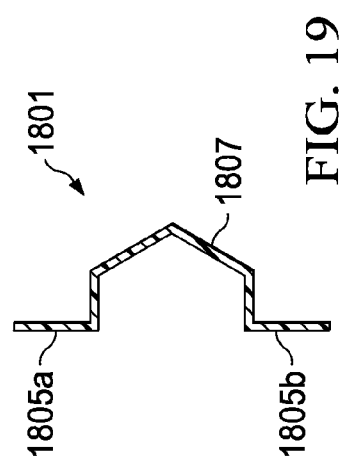
FIG. 19 is a top view of an intermediate member, according to one example embodiment.

Referring now also to FIGS. 18 and 19, a method for bonding composite core have exposed flanges, such as composite core 1701, to a component 1803 in a core stiffened structure is described and illustrated. An intermediate member 1801 is bonded between component 1803 and composite core 1701.

Intermediate member 1801 can be a variety of geometric configurations depending in part upon the tessellating geometry of the composite core. In the example embodiment, intermediate member 1801 includes to a first wall 1805a and a second wall 1805b and an insert portion 1807 therebetween. Insert portion 1807 fits at least partially within an exposed cell of composite core 1701, while first all 1805a and second wall 1805b fit against a surface of component 1803. In the example embodiment, the insert portion 1807 fits completely within the exposed cell of composite core 1701 to maximize the available bonding surfaces; however, an embodiment that doesn't require as much bonding surface may only partially attach within the exposed cell of composite core 1701.

In the example embodiment, magnets 1809a and 1809b are utilized to generate the desired pressure at the adhesive 1811 bondline between not only component 1803 and walls 1805a and 1805b, but also between insert portion 1807 and the exposed cell of composite core 1701. As discussed further herein, the adhesive 1811 can be any implementation specific type of adhesive. The adhesive 1811 can be a paste adhesive or a film adhesive, to name a few examples. Further, the pressure from the magnetic attraction can be generated by a magnet and a ferrous element rather than two magnets.

In another method of the present disclosure, rather than the composite core being cut from a bulk composite core to fit within a geometry specific core stiffened structure, the composite core is manufactured with a net edge surface that geometrically coincide with the surfaces of the components to which the composite core is bonded to in the core stiffened structure. The present disclosure contemplates at least two methods of manufacturing net edge composite core. One method involves wrapping mandrels with composite material and stacking the wrapped mandrels together in an assembly tool having a define shape, some mandrels having partial mandrel shapes to create a net edge. The other method involves using mandrels as tools such that layers of composite material are presses between layers of mandrels, at least some mandrels having a partial mandrel shape to create a net edge. These methods are described further herein.

Figure 20:
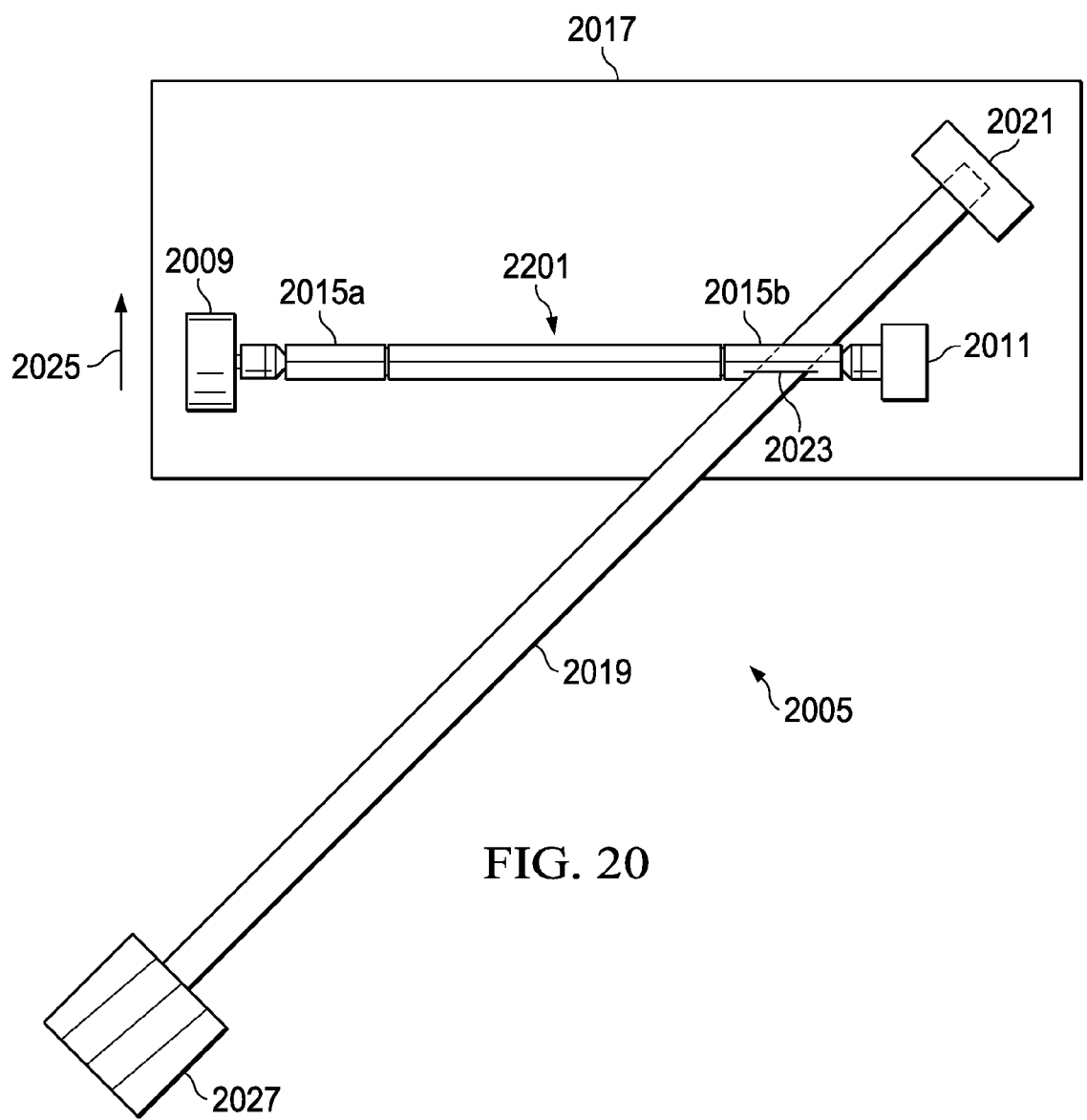
FIG. 20 is a top view of a winding jig for the manufacturing of net edge composite core, according to one example embodiment.
Figure 21:
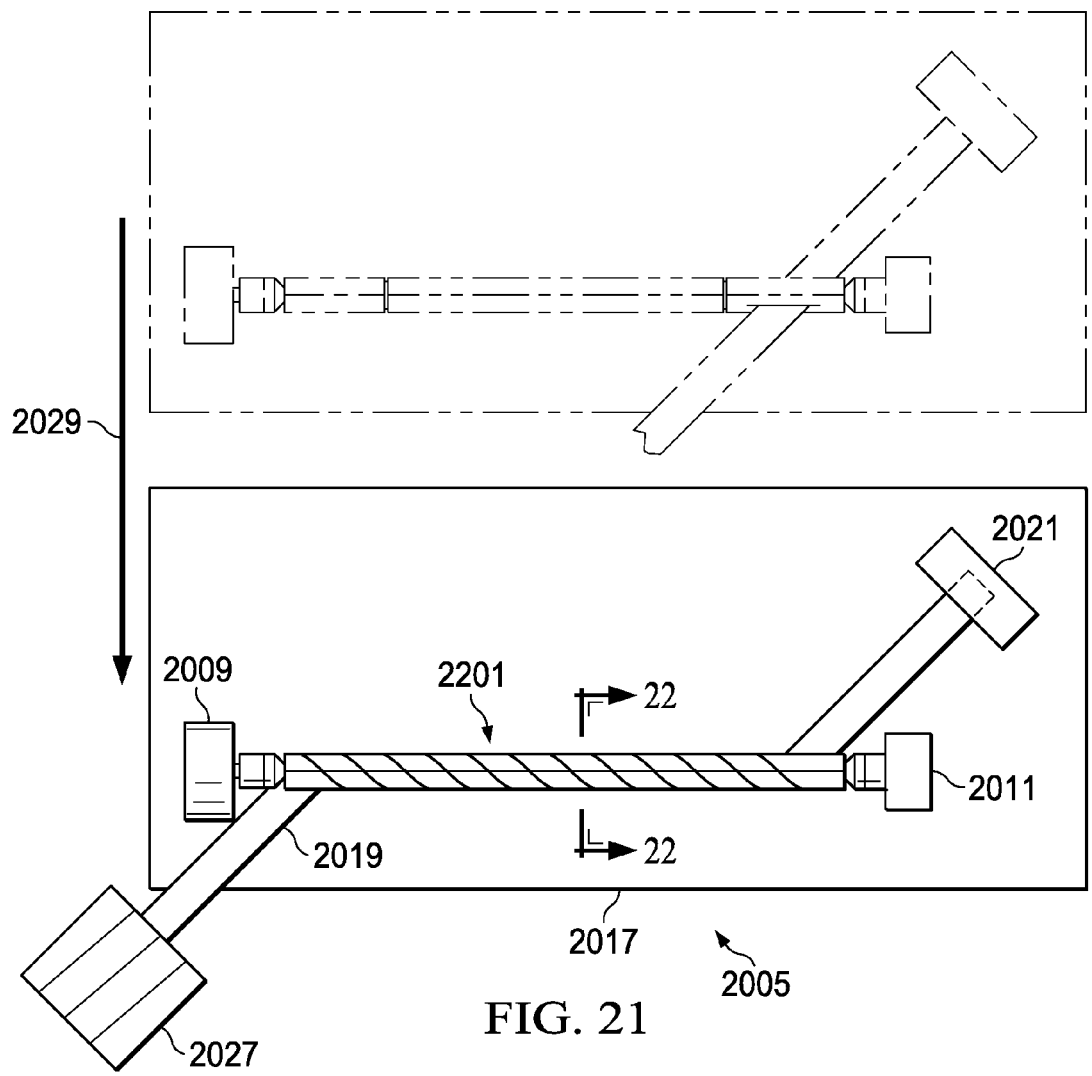
FIG. 21 is a top view of a winding jig for the manufacturing of net edge composite core, according to one example embodiment.
Figure 22:
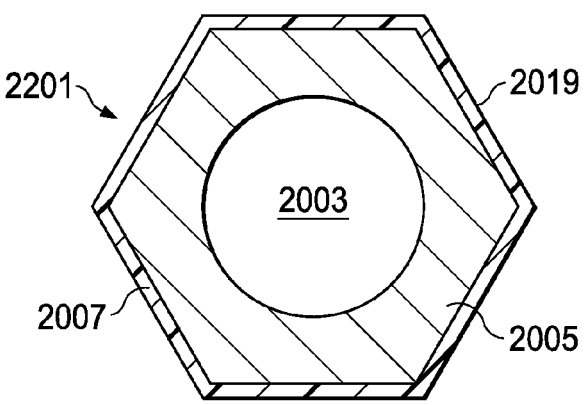
FIG. 22 is a cross-sectional view of a composite wrapped mandrel for the manufacturing of net edge composite core, take from section lines 22-22 in FIG. 21, according to one example embodiment.

Referring now to FIGS. 20-22, one example embodiment for wrapping mandrels with composite material for the manufacturing of net edge core is described and illustrated.

Referring to FIG. 22, a cross-sectional view through a mandrel 2201 is illustrated. In the illustrated embodiment, mandrel 2201 is a metallic mandrel, such an aluminum material. Mandrel 2201 is configured having a material with a relatively low coefficient of thermal expansion (CTE). In the illustrated embodiment, mandrel 2201 is can be cured in a tool that utilizes pressure from the exterior to generate the desired pressure upon the composite material. However, it should be appreciated that the curing method can be configured with a material having a desired amount of CTE so that curing pressure is primarily derived from a thermal expansion of the mandrels within a confining tool. In another embodiment, the curing pressure can be derived from any combination of mandrel CTE and external tooling pressure.

Mandrel 2201 may be configured with a hollow portion 2203 extending through the centerline length of mandrel 2201, forming a body portion 2205 between hollow portion 2203 and outer surface 2207. Mandrel 2201 can be configured so that during the curing process of the composite core, the temperature of each mandrel 2201 is increased such that body portion 2205 volumetrically expands uniformly both in an inward direction and an outward direction, until outer surface 2207 is bounded by its nearest neighbor mandrel, at which point the pressure exerted by mandrel 2201 on its nearest neighbor mandrel remains relatively constant, and the thermal expansion of body portion 2205 continues primarily in inward direction. The degree of thermal expansion each mandrel 2201 is dependent upon the CTE of the material of each mandrel 2201. The geometry of mandrel 2201 can be selected to tailor the physical properties of mandrel 2201 and the resultant composite core. Further, the geometry of mandrel 2201 can be selected to tailor the strength/stiffness of the mandrel 2201. Further, the wall thickness of body portion 2205, as well as the geometry of hollow portion 2203, can be selectively controlled to produce a desired thermal expansion profile. For example, a mandrel having a smaller hollow portion 2203 would provide a higher external pressure than mandrel 2201. In the illustrated embodiment, hollow portion 2203 is of a cylindrical shape; however, it should be appreciated that other embodiments may have non-cylindrical shapes.

Figure 23:
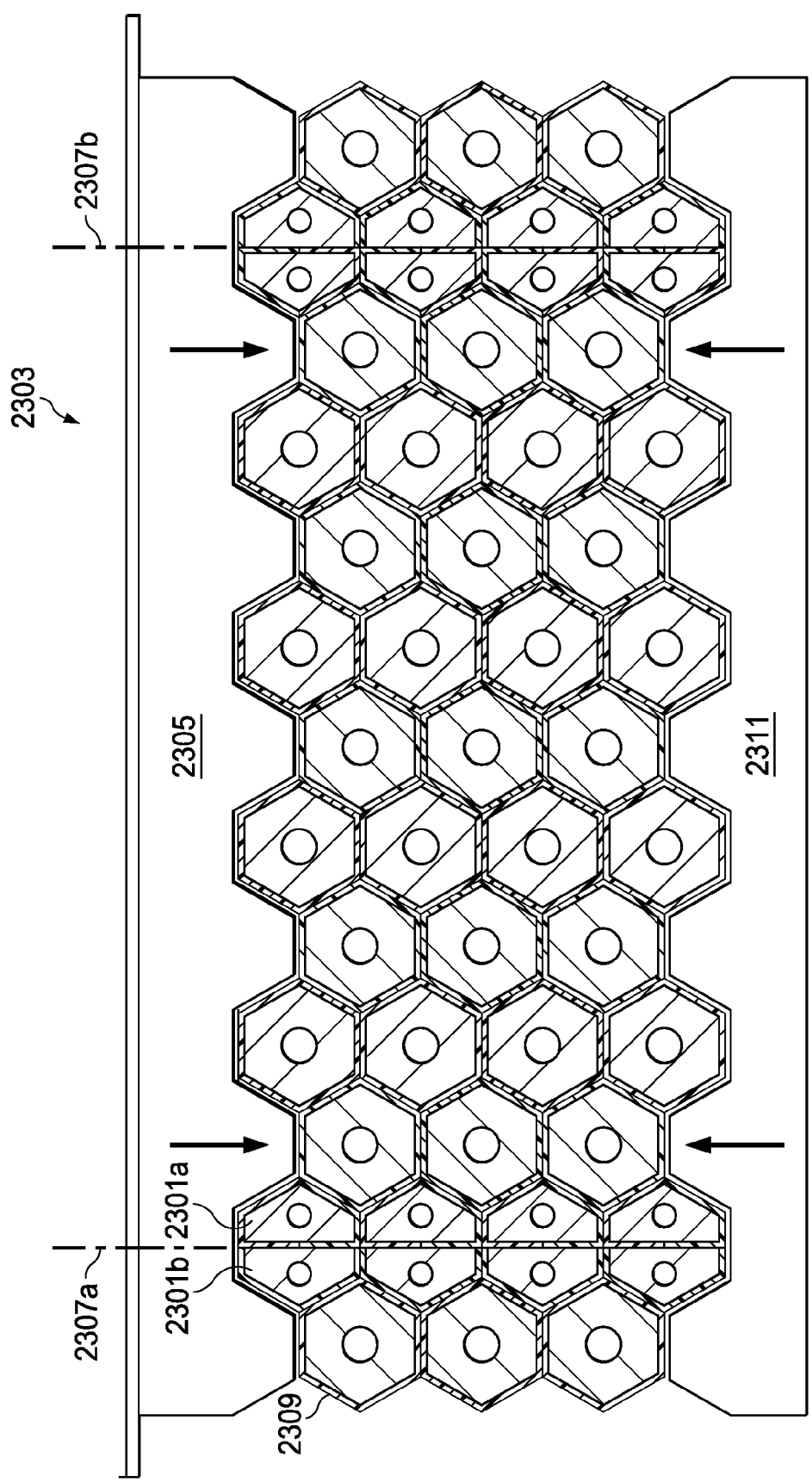
FIG. 23 is a side view of a curing tool for the manufacturing of a net edge core, according to one example embodiment.

Each mandrel 2201 can be configured with a hollow portion 2203 to allow hot air to be ducted therethrough during the cure cycle. However, it should be appreciated that an alternative embodiment of mandrel 2201 does not include a hollow portion 2203. It should be appreciated that mandrel 2201 is merely illustrative of a wide variety of mandrel configurations contemplated. Even though the exterior shape of the mandrels are illustrated as hexagonal, the present disclosure includes mandrels having other exterior shapes, such as square, rectangular, triangular, to name a few examples. Further, it should be appreciated that the hollow portion within the mandrels can be any variety of shape, or shapes. The exact shape of the hollow portion is implementation specific. Further, for the manufacturing of net edge core, the mandrel 2201 can be a partial mandrel shape. For example, the mandrel 2201 can be a half mandrel 2301, as illustrated in FIG. 23.

In one example embodiment, a Teflon® material, or other bond resistant material or coating, can be used to prevent the composite material from bonding to the exterior surface of mandrel 2201 during the cure cycle. As such, each mandrel 2201 can include a layer of the bond resistant material adjacent to the outer surface 2207 of each mandrel 2201.

Referring now also to FIGS. 20 and 21, an example method of wrapping a mandrel 2201 is described and illustrated. The exact method of wrapping or otherwise depositing the uncured composite material on each mandrel 2201 is implementation specific. An embodiment of a winding jig 2005 is illustrated. Winding jig 2005 is configured to position and retain mandrel 2201 for the depositing of composite material thereon. It should be appreciated that winding jig 2005 can take on a variety of implementation specific configurations. In one embodiment, winding jig 2005 can include a driver 2009 and a support member 2011. Adapters 2013a and 2013b are operably associated with driver 2009 and support member 2011, respectively. A coupling 2015a is positioned between driver 2009 and a first end portion of mandrel 2201. Similarly, a coupling 2015b is positioned between support member 2011 and a second end portion of mandrel 2201.

Winding jig 2005 is configured to operably secure mandrel 2201 between couplings 2015a and 2015b. Couplings 2015a and 2015b have similar geometry to that of mandrel 2201. Further, winding jig 2005 is configured such that the geometry of couplings 2015a and 2015b are aligned with mandrel 2201 during the composite material winding process. In the illustrated embodiment, driver 2009 is configured to drive the rotation of adapters 2013a and 2013b, couplings 2015a and 2015b, and mandrel 2201, while support member 2011 is configured to provide freewheeling support. In an alternative embodiment, mandrel 2201 and couplings 2015a and 2015b are held stationary while a device operates to place the composite material about the mandrel and couplings 2015a and 2015b, as discussed further herein. It should be appreciated that winding jig 2005 is merely illustrative of a fixture that can be used to facilitate the depositing of composite material onto mandrel 2201.

Winding jig 2005 is mounted to a platform 2017 that can be translated along a prescribed path. A first end portion of a slit 2019 of uncured composite material can be secured to a mount 2021 that is secured to platform 2017. Slit 2019 is positioned through an opening 2023 in coupling 2015b. A second end portion of slit 2019 can remain part of a roll 2027 of composite material. Platform 2017 is biased in direction 2025 by a constant tension member such that slit 2019 is held in tension. Mount 2021 and roll 2017 are positioned so that slit 2019 is oriented at a desired angle relative to mandrel 2201. In the illustrated embodiment, the desired angle of slit 2019 is 45 degrees; however, slit 2019 can be oriented at any desired angle.

During operation, driver 2009 is operated so as to cause mandrel 2201 to rotate, which causes slit 2019 to wrap around mandrel 2201. As slit 2019 wraps around mandrel 2201, platform 2017 is pulled toward roll 2017 in direction 2029 while the wrap angle is maintained.

It should be appreciated that the winding jig 2005 can be configured in any variety of implementation specific configurations. For example, mandrel 2201 can rotate in a first rotational direction while a material placement head rotates around mandrel 2201 in an opposite direction to that of the first rotational direction. Further, either mandrel 2201 can translate along its axis or the material placement head can translate in a direction corresponding to the mandrel axis, or any combination thereof.

Figure 24:
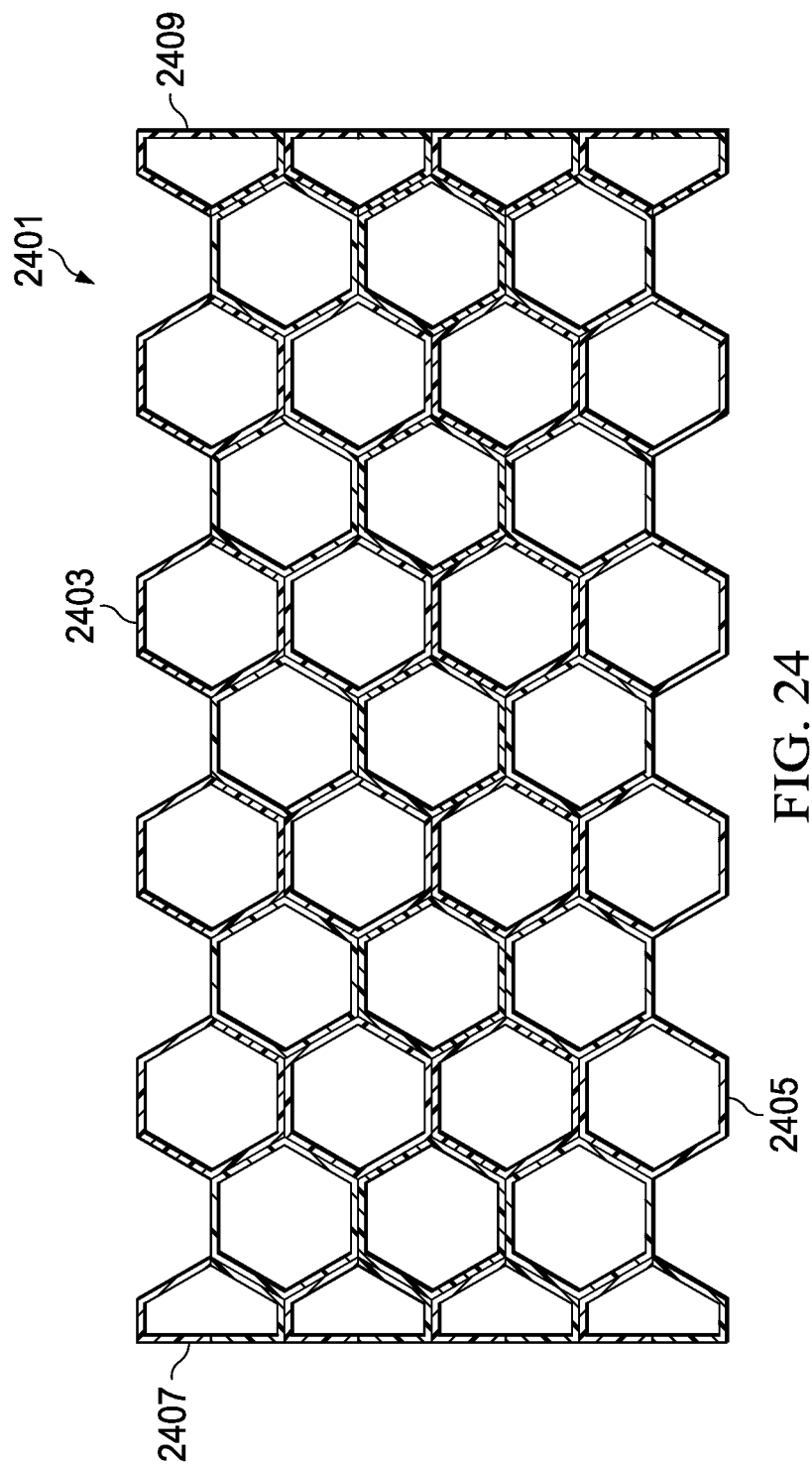
FIG. 24 is a top view of net edge core, according to an example embodiment.

Referring now also to FIG. 23, one example embodiment of a curing tool 2303 for the manufacturing of a net edge core is illustrated, such as net edge core 2401 shown in FIG. 24. Curing tool 2303 is illustrated with an upper mold 2305 and a lower mold 2311; however, it should be appreciated that curing tool 2303 can include side tools. In the illustrated embodiment, the desired side edges of the net edge core that don't already coincide with a flat edge of the core are labeled as first edge 2307a and second edge 2307b. It should be appreciated that alternative embodiments of net edge core can include any number of edges that don't have a natural edge from a cell wall. In order to create the desired flat surfaces at an edge, such as first edge 2307a, one or more interior partial mandrels 2301a having composite material associated therewith are pressed against one ore more outer partial mandrels 2301b also having composite material associated therewith. In another embodiment, the partial mandrels 2301b are wrapped with non-bonding material, or dummy material, so the material associated with partial mandrel 2301b doesn't bond with the composite material associated with partial mandrel 2301a, which therefore prevents a subsequent post-cure trimming operation. Spacer mandrels 2309 can be utilized to insure adequate pressure on the composite material associated with partial mandrels 2301a and 2301b. The assembly can then be cured at the requisite temperature and duration. Pressure can be applied from the tooling, such as upper and lower molds 2305 and 2511, and/or from the thermal expansion of the mandrels.

Curing tool 2303 can also be utilized to manufacturing a net edge core, such as net edge core 2401, by the process of sequentially laying up layers of composite material between the mandrels rather than wrapping the mandrels.

Referring now also to FIG. 24, a net edge core 2401 is illustrated. Net edge core 2401 is illustrative of a core derived from the tooled assembly illustrated in FIG. 23. After the curing cycle is completed, the mandrels can be removed, and then the composite material outside of first edge 2307a and second edge 2307b can be trimmed to produce the net edge core 2401. Net edge core 2401, as illustrated, has natural flat surfaces 2403 and 2405 from the flat hexagonal surfaces of the cell walls. However, flat surfaces 2407 and 2407 are derived from the use of partial mandrels, such as partial mandrels 2301a and 2301b.

Figure 25:
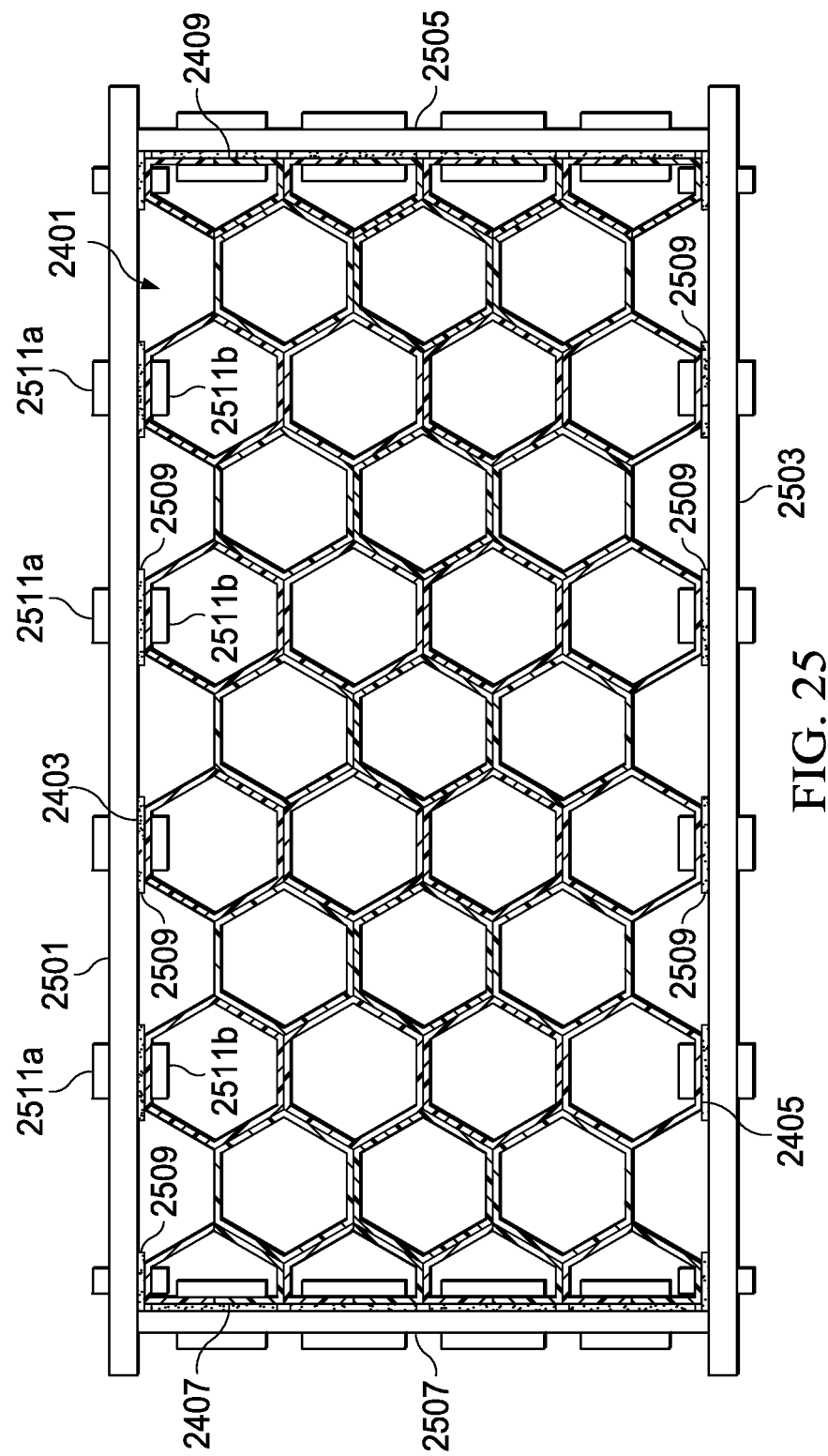
FIG. 25 is a top view of net edge core being bonded to substructure of a core stiffened structure, according to an example embodiment.

Referring now also to FIG. 25, a method of bonding net edge core 2401 to substructure is illustrated. One method of the present disclosure utilizes a magnetic force between either two magnets, or a magnet and a ferrous member, to create pressure at a bondline for bonding a composite core to an adjacent structure. In the example embodiment, net edge core 2401 is bonded to adjacent structural components 2501, 2503, 2505, and 2507 with an adhesive 2509. Structural components 2501, 2503, 2505, and 2507 can be any variety of components. In one illustrative example, components 2501 and 2503 are spar members for an airfoil structure, while components 2505 and 2507 are rib members for the airfoil structure.

At each bonding location, a magnet 2511a is located on an opposite surface from the surface to which the adhesive 2509 is located. Magnet 2511b is located on an interior of the flat outer surface of net edge core 2401. Thus, magnets 2511a and 2511b attract to each other and not only act to locate the side of composite core 2401 to the tooled location of the structural components 2501, 2503, 2505, and 2507, but also generate the bondline pressure to adhesive 2509 throughout the curing cycle. Once the adhesive 2509 is cured, the magnets 2511a and 2511b can be removed.

Manufacturing net edge core, as well as using magnets to generate bond line pressure when bonding net edge core to components within an assembly, have significant advantages over conventional methods and structures. For example, utilizing net edge core allows the core to be bonded on all surfaces and to be controlled more precisely at the location of the edges and contours. Further, utilizing net edge core increases the bonding surface area and provides more consistent pressure at the bonding locations. Further, utilizing net edge core eliminates loose edges and flanges that are difficult to machine and set up for machining. Further, utilizing net edge core eliminates a need to machine exposed flanges and reduces waste during fabrication. Further, manufacturing net edge core allows multiple net edge cores to be bonded together to form a larger net edge core by greatly simplifying the splicing of two or more net edge cores together.

Further, utilizing magnets to generate bondline pressure when bonding net edge core to substructure also has significant advantages. For example, magnets can be inserted deep into the net edge core, whereas mechanical devices have geometric limitations. Further, magnets can provide uniform clamping pressure at the bondline along the entire length of the magnet; whereas mechanical devices, such as spring loaded clips can provide unequal pressure. Further, magnets are low profile and can be located so as to not protrude out of the surface network, thus allowing the adhesive to be co-cured with other components of a core stiffened composite structure.

The particular embodiments disclosed above are illustrative only, as the apparatus may be modified and practiced in different but equivalent manners apparent to those skilled in the art having the benefit of the teachings herein. Modifications, additions, or omissions may be made to the apparatuses described herein without departing from the scope of the invention. The components of the apparatus may be integrated or separated. Moreover, the operations of the apparatus may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

The invention claimed is:

1. A method of carving a contour surface on a composite core, the method comprising:
   positioning a first edge of the composite core against a first tooled member;
   locating a first magnet within an outer cell member along the first edge of the composite core so that the first edge of the composite core is magnetically drawn to the first tooled member;
   locating a second magnet along a second edge of the composite core such that the second edge of the composite core is magnetically drawn to a second tooled member; and
   carving a first contour of a surface network of the composite core while the composite core is releasably secured to the first tooled member and the second tooled member with the first magnet and the second magnet, such that the first contour is carved while the composite core is in a tooled position that is indicative of a final desired contour in a composite structure.

2. The method according to claim 1, wherein the step of carving the first contour includes machining the composite core.

3. The method according to claim 1, wherein the step of carving the first contour includes machining a depth of the surface network of the composite core.

4. The method according to claim 1, wherein the first tooled member and the second tooled member are ferrous metal members.

5. The method according to claim 1, wherein the composite core has hexagonal cell members.

6. The method according to claim 1, wherein the first magnet is an electromagnet.

* * * * *